(12) United States Patent
Bennett et al.

(10) Patent No.: US 11,574,026 B2
(45) Date of Patent: Feb. 7, 2023

(54) ANALYTICS-DRIVEN RECOMMENDATION ENGINE

(71) Applicant: Avanade Holdings LLC, Wilmington, DE (US)

(72) Inventors: Michele D. Bennett, Berwyn, PA (US); Mark J. Garavaglia, Mercer Island, WA (US); Michael P. Isaac, Chanhassen, MN (US); Stephanie Mills, London (GB); William Jeffrey Harding, Seattle, WA (US); Anthony Joseph Molisani, Philadelphia, PA (US); William Scott Powell, Seattle, WA (US); Robert James Boisjolie, Pennington, NJ (US)

(73) Assignee: Avanade Holdings LLC, Wilmington, DE (US)

(*) Notice: Subject to any disclaimer, the term of this patent is extended or adjusted under 35 U.S.C. 154(b) by 129 days.

(21) Appl. No.: 16/947,064

(22) Filed: Jul. 16, 2020

(65) Prior Publication Data

US 2021/0019357 A1  Jan. 21, 2021

Related U.S. Application Data

(60) Provisional application No. 62/875,183, filed on Jul. 17, 2019.

(51) Int. Cl.
*G06F 16/9535* (2019.01)
*G06F 16/2457* (2019.01)
(Continued)

(52) U.S. Cl.
CPC .... *G06F 16/9535* (2019.01); *G06F 16/24578* (2019.01); *G06N 20/00* (2019.01); *G10L 15/063* (2013.01); *G10L 15/18* (2013.01); *G10L 15/22* (2013.01); *G06Q 10/06393* (2013.01)

(58) Field of Classification Search
CPC .......... G06F 16/9535; G06F 16/24578; G06N 20/00; G10L 15/063; G10L 15/18; G10L 15/22; G06Q 30/02
(Continued)

(56) References Cited

U.S. PATENT DOCUMENTS

| 10,769,649 | B1 * | 9/2020 | PrasannaKumar ......................... G06Q 30/0203 |
| 2004/0019657 | A1 * | 1/2004 | Akiyama .............. G06F 16/951 709/217 |

(Continued)

FOREIGN PATENT DOCUMENTS

| AU | 2006200538 A1 * | 9/2007 | ....... G06Q 10/06393 |
| AU | 2008202164 A1 * | 12/2008 | ............. G06Q 10/06 |

(Continued)

OTHER PUBLICATIONS

Bennett et al., "Defining customer experience and measuring its impact on financial performance of US publicly traded companies," SocArXiv, Apr. 14, 2020, 26 pages [Retrieved from https://doi.org/10.31235/osf.io/mzepq on Jul. 16, 2020].

(Continued)

*Primary Examiner* — Ashish Thomas
*Assistant Examiner* — Abdullah A Daud
(74) *Attorney, Agent, or Firm* — Harrity & Harrity, LLP

(57) ABSTRACT

A device may transmit questionnaires to a set of client devices, wherein the questionnaires include a set of questions that relate to an internal entity experience attribute and/or an external entity experience attribute. The device may receive a set of questionnaire responses and correlate the set of questionnaire responses with contextual data relating to an entity. The device may process, using a machine learning model trained based on data relating to one or more other entities, the set of questionnaire responses and (Continued)

the contextual data to identify a set of features and a set of feature ranks. The device may select a subset of features based on the set of feature ranks and a set of influence thresholds. The device may generate a set of recommendations associated with the subset of features and communicate with one or more other devices to implement the set of recommendations.

20 Claims, 9 Drawing Sheets

(51) Int. Cl.
 *G10L 15/06* (2013.01)
 *G10L 15/22* (2006.01)
 *G10L 15/18* (2013.01)
 *G06N 20/00* (2019.01)
 *G06Q 10/06* (2012.01)
(58) Field of Classification Search
 USPC .......................................................... 707/730
 See application file for complete search history.

(56) References Cited

U.S. PATENT DOCUMENTS

| | | | |
|---|---|---|---|
| 2010/0179802 A1* | 7/2010 | Best | G06F 40/42 704/2 |
| 2010/0332287 A1* | 12/2010 | Gates | G06Q 30/02 379/265.09 |
| 2013/0282430 A1* | 10/2013 | Kannan | G06Q 30/02 705/7.29 |
| 2017/0221072 A1* | 8/2017 | AthuluruTlrumala | G06Q 10/109 |
| 2018/0060780 A1* | 3/2018 | Kilmartin | G06Q 10/06316 |
| 2020/0058298 A1* | 2/2020 | Ban | G06F 3/0237 |
| 2020/0258023 A1* | 8/2020 | Paolella | G06V 40/23 |
| 2020/0387848 A1* | 12/2020 | Kasa | G06F 16/3344 |
| 2021/0019357 A1* | 1/2021 | Bennett | G06F 40/20 |
| 2021/0279793 A1* | 9/2021 | Leise | G06Q 40/02 |

FOREIGN PATENT DOCUMENTS

| | | | | |
|---|---|---|---|---|
| CN | 107169806 B | * | 11/2020 | G06Q 10/04 |
| JP | 2017156878 A | * | 9/2017 | |

OTHER PUBLICATIONS

Bennett et al., "Technical innovation and perceived usability outperform NPS in correlation to financial performance in US publicly traded companies," SocArXiv, Apr. 20, 2020, 5 pages [Retrieved from https://doi.org/10.31235/osf.io/kw4tn on Jul. 16, 2020].

Bennett et al., "Customer experience quality surpasses NPS in correlation to financial performance, customer loyalty and customer satisfaction," SocArXiv, Apr. 20, 2020, 7 pages [Retrieved from https://doi.org/10.31235/osf.io/7bfe4 on Jul. 16, 2020].

* cited by examiner

ANALYTICS-DRIVEN RECOMMENDATION ENGINE

CROSS-REFERENCE TO RELATED APPLICATION

This patent application claims priority to U.S. Patent Application No. 62/875,183, filed on Jul. 17, 2019, and entitled "SYSTEMS FOR EVALUATING, COMPARING, AND PREDICTING PERFORMANCE." The disclosure of the prior application is considered part of and is incorporated by reference into this patent application.

BACKGROUND

Data analytics involves using data to discover useful information, inform conclusions, and/or support decision-making. For example, an entity may collect data and use data analytics to monitor one or more functions of the entity, make decisions, make recommendations, and/or the like.

SUMMARY

In some implementations, a method includes transmitting, by a device, a set of questionnaires to a set of client devices, wherein the set of questionnaires include a set of questions that relate to at least one of an internal entity experience attribute or an external entity experience attribute; receiving, by the device, a set of questionnaire responses based at least in part on transmitting the set of questionnaires; correlating, by the device, the set of questionnaire responses with contextual data relating to an entity; processing, by the device and using a machine learning model trained based on data relating to one or more other entities, the set of questionnaire responses and the contextual data to identify a set of features and a set of feature ranks, wherein each feature is associated with an influence threshold; selecting, by the device, a subset of features based on the set of feature ranks and a set of influence thresholds; generating, by the device, a set of recommendations associated with the subset of features, wherein each recommendation is associated with improving a feature rank, of the set of feature ranks, associated with a feature, of the subset of features; and communicating with one or more other devices to implement the set of recommendations based on generating the set of recommendations.

In some implementations, a device includes one or more memories; and one or more processors, communicatively coupled to the one or more memories, configured to: receive a command to identify a recommendation for an entity; obtain, based on receiving the command, a data set relating to an internal entity experience attribute, an external entity experience attribute, and an entity performance attribute; process, using a machine learning model trained based on data relating to one or more other entities, the data set to identify a set of features and a set of feature ranks, wherein the set of features is associated with a corresponding set of influence thresholds; generate a set of feature scores for the set of features, wherein a feature score, of the set of feature scores, is based on a value of a feature rank, of the set of feature ranks, relative to an influence threshold, of the set of influence thresholds, a resource cost of changing the feature rank, and an estimated result of changing the feature rank; select a particular feature, from the set of features, based on a corresponding feature score of the set of feature scores; generate the recommendation for the particular feature using a recommendation engine; and communicate with one or more systems to implement the recommendation based on generating the recommendation.

In some implementations, a non-transitory computer-readable medium storing a set of instructions includes one or more instructions that, when executed by one or more processors of a device, cause the device to: obtain a data set of questionnaire responses relating to a set of internal entity experience attributes and a set of external entity experience attributes; correlate the data set with contextual data relating to performance of an entity; process, using a machine learning model trained based on data relating to one or more other entities, the data set and the contextual data to identify a set of features and a set of feature ranks, wherein each feature is associated with an influence threshold; select a subset of features based on the set of feature ranks and a set of influence thresholds; process information relating to the subset of features to generate a set of recommendations associated with the subset of features, wherein each recommendation is associated with improving a feature rank, of the set of feature ranks, associated with a feature, of the subset of features; and automatically implement the set of recommendations.

DETAILED DESCRIPTION

Figure 1A:
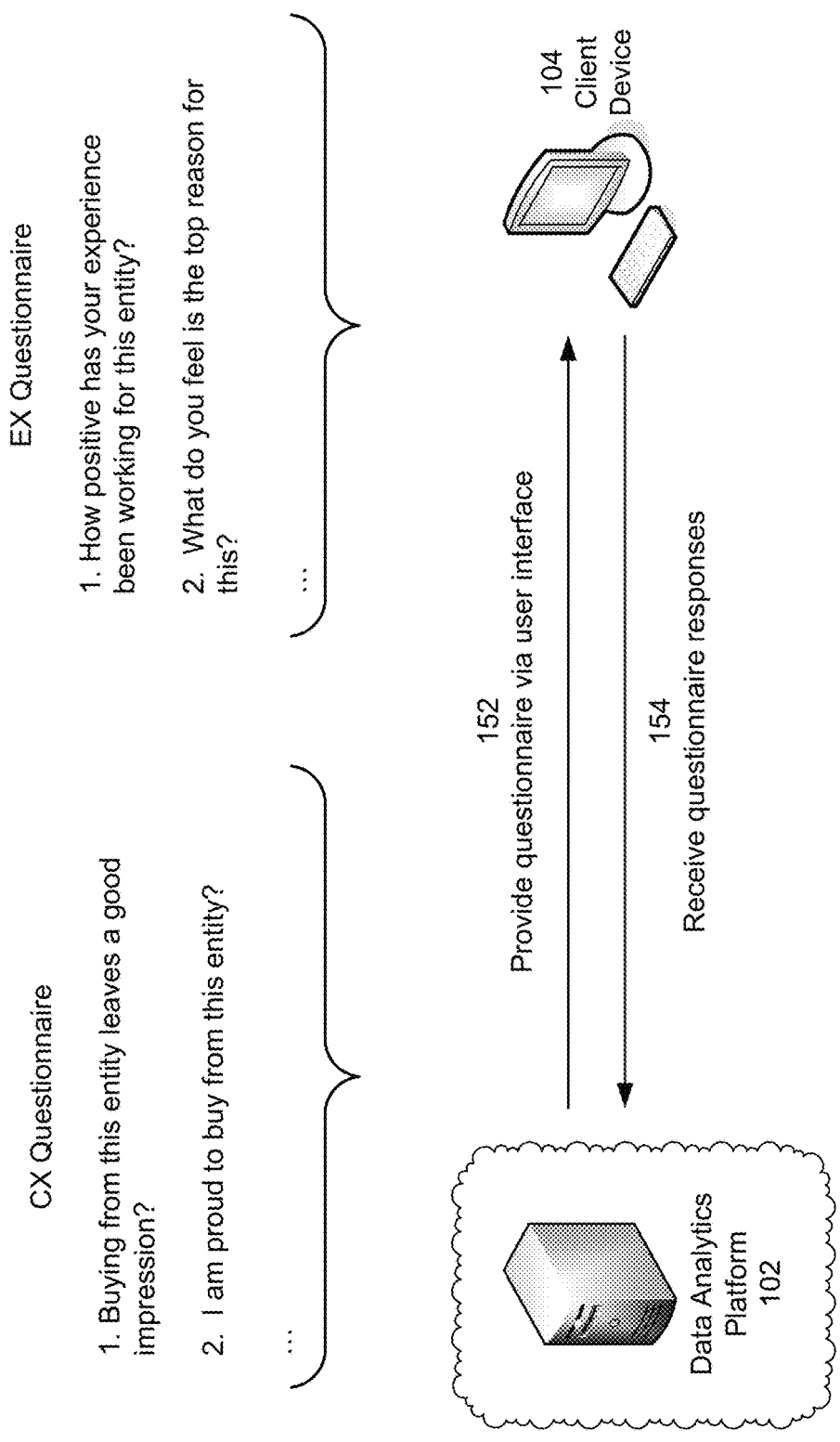
FIGS. 1A-1E are diagrams of an example implementation described herein.

The following detailed description of example implementations refers to the accompanying drawings. The same reference numbers in different drawings may identify the same or similar elements.

An entity may collect data and use data analytics to monitor one or more functions of the entity, to evaluate performance of the entity in one or more areas, and/or the like. For example, an entity may use data analytics to evaluate the entity's performance with respect to customer service, customer experience, employee satisfaction, workplace satisfaction, and/or the like. The entity may use the data analytics to identify one or more areas for improvement (e.g., one or more areas where the performance of the entity is poor or below average). For example, the data analytics may indicate that improving a customer experience may lead to better customer engagement, thereby improving business performance (e.g., financial performance) of the entity.

However, the data analytics may not indicate specific tasks or actions to be taken to improve the one or more areas identified by the data analytics. For example, the entity may identify that an experience provided by the entity should be improved in order to improve business performance of the entity. The entity may research and/or identify different features of an experience attribute. The entity may identify different actions that may be taken or tasks to improve the different features of the experience attribute. The entity may implement one or more actions and/or tasks in an attempt to improve the feature of the experience attribute, and thereby improve the business performance of the entity. This may consume resources (e.g., processing resources, memory resources, power resources, computing resources, communication resources, time resources, financial resources, and/ or the like) associated with researching/identifying the different features of the experience attribute, identifying different actions that may be taken or tasks to improve the different features of the experience attribute, implementing one or more actions and/or tasks in an attempt to improve the features of the experience attribute, and/or the like.

Moreover, the different features of the experience attribute identified may have different impacts on the overall level or rank of the experience attribute (e.g., with respect to competitors). For example, one feature, if improved by the entity, may not improve (or may only slightly improve) the overall level or rank of the experience attribute. Another feature, if improved by the entity, may improve the overall level or rank of the experience attribute. However, the entity may be unaware of a rank at which the feature begins to impact the overall level or rank of the experience attribute. As a result, the entity may choose to consume resources attempting to improve a feature of the experience attribute that does not impact the business performance of the entity. Therefore, this may consume resources associated with blindly choosing features of the experience to improve that may not have an impact (or may have a small impact) on the overall level or rank of the experience attribute (e.g., and the business performance of the entity).

Some implementations described herein enable an analytics-driven cloud-implemented recommendation engine that utilizes a machine learning model to identify a set of features and a set of feature ranks associated with at least one of an internal entity experience attribute or an external entity experience attribute. Each feature may be associated with an influence threshold indicating a feature rank, or range of feature ranks, of the feature in which the feature will influence or impact an internal entity experience attribute or an external entity experience attribute. A device that includes the analytics-driven cloud-implemented recommendation engine may select a subset of features based on the set of feature ranks and a set of influence thresholds and generate a set of recommendations associated with the subset of features, wherein each recommendation is associated with improving a feature rank, of the set of feature ranks, associated with a feature, of the subset of features. As a result, the device identifies features of the internal entity experience attribute or the external entity experience attribute that, if improved, will impact the internal entity experience attribute or the external entity experience attribute. The device generates recommendations for improving the identified features and may communicate, with one or more other devices, to implement the recommendations. This conserves resources that would have otherwise been used researching/identifying the different features of the experience attribute, identifying different actions that may be taken or tasks to improve the different features of the experience attribute, implementing one or more actions and/or tasks in an attempt to improve the experience attribute, and/or the like. Additionally, this conserves resources that would have otherwise been used blindly choosing features of the experience attribute to improve that may not have an impact (or may have a small impact) on the overall level or rank of the experience attribute (e.g., on an output of a machine learning model, on the business performance of the entity, and/or the like).

FIGS. 1A-1E are diagrams of an example 100 associated with an analytics-driven recommendation engine. As shown in FIGS. 1A-1E, example 100 includes a data analytics platform 102 and a client device 104. The analytics platform 102 may be a cloud based platform. For example, the analytics platform 102 may be deployed in a cloud computing environment. In some implementations, the analytics platform 102 and the client device 104 may be implemented in the same cloud computing environment (e.g., a cloud computing environment of an entity associated with the client device 104, a cloud computing environment of an entity associated with the analytics platform 102, and/or the like). In some implementations, the analytics platform 102 and the client device 104 may not be deployed in the same cloud computing environment. For example, the analytics platform 102 may be deployed in a cloud computing environment of an entity associated with the analytics platform 102 and the client device may communicate with the analytics platform 102.

As shown in FIG. 1A, and by reference number 152, the analytics platform 102 may provide a questionnaire via a user interface to the client device 104. For example, the analytics platform 102 may transmit a set of questionnaires to a set of client devices 104. The set of questionnaires may relate to at least one of an internal entity experience attribute or an external entity experience attribute. For example, the set of questionnaires may relate to a customer experience (CX) attribute (e.g., an external entity experience attribute), an employee experience (EX) attribute (e.g., an internal entity experience attribute), and/or the like. In some implementations, questionnaire data may include data obtained from surveys, polls, focus groups, and/or the like.

In some implementations, the set of questionnaires that relate to the customer experience attribute may relate to a set of underlying sub-attributes. For example, sub-attributes associated with the customer experience attribute may include a perceived value sub-attribute, a convenience sub-attribute, a functional quality sub-attribute, a service quality sub-attribute, a brand trust sub-attribute, an employee-customer engagement sub-attribute, a perceived usability sub-attribute, a perceived risk sub-attribute, a technical innovation sub-attribute, a Net Promoter Score sub-attribute, an activity in social media sub-attribute, a customer satisfaction sub-attribute, an overall customer experience sub-attribute, and/or the like.

The set of questionnaires that relate to the customer experience attribute may include questions related to one or more of the underlying sub-attributes. For example, questions related to the perceived value sub-attribute may include: "Buying from this company leaves a good impression?", "Overall the cost of products and services [from this entity offers] value for the money spent?", "I am proud to work with or buy from this entity?", and/or the like. Questions related to the convenience sub-attribute may include: "Working with or buying from this entity is convenient?", "This entity offers flexible options to buy and use their products and/or services?", and/or the like. These questions are provided merely as examples and the set of questionnaires that relate to the customer experience attribute may include any questions related to a customer experience.

In some implementations, the set of questionnaires that relate to the employee experience attribute may relate to a set of underlying sub-attributes. For example, sub-attributes associated with the employee experience attribute may include a collaboration sub-attribute, a creativity sub-attribute, an empowerment sub-attribute, a diversity sub-attribute, a personal financial health sub-attribute, a personal growth sub-attribute, a leadership/direct supervisor sub-attribute, a belief in entity competitiveness sub-attribute, an overall employee experience sub-attribute, a technology work complexity sub-attribute, a process work complexity sub-attribute, a culture sub-attribute, a self-efficacy sub-attribute, and/or the like.

The set of questionnaires that relate to the employee experience attribute may include questions related to one or more of the underlying sub-attributes. For example, questions related to the overall employee experience sub-attribute may include: "Overall, how positive has your experience been working for this entity?", "What do you feel is the top reason for this?", "How likely are you to recommend this entity to a friend as a good place to work?", and/or the like. Questions related to the collaboration sub-attribute may include: "Do you and your colleagues collaborate, share new ideas and experiences, and work across silos and functions?", "Does the entity seek and utilize all employee feedback and opinions regardless of level within the entity?" "Does the entity invest in tools for collaboration, so all employees can be connected and engaged?", and/or the like. These questions are provided merely as examples and the set of questionnaires that relate to the employee experience attribute may include any questions related to an employee experience.

As shown by reference number 154, the data analytics platform 102 may receive questionnaire responses from the client device 104 (or a set of client devices 104). For example, the data analytics platform 102 may receive a set of questionnaire responses based at least in part on transmitting the set of questionnaires. In some implementations, the set of questionnaire responses may be in a numeric form. For example, a question may be posed as "To what extent would you agree or disagree with the following," with the choices of answers being: 1—strongly disagree, 2—disagree, 3 neither disagree nor agree, 4—agree, and 5—strongly agree. A response included in the set of questionnaire responses may be "5," indicating that the response is that the user responding to the question included in the questionnaire strongly agrees with the statement (e.g., the question included in the questionnaire).

In some implementations, the set of questionnaire responses may be in a natural language form. The analytics platform 102 may apply natural language processing to interpret the set of questionnaire responses and generate additional information associated with the potential meaning of information within the set of questionnaire responses. Natural language processing may involve techniques performed (e.g., by the analytics platform 102) to analyze, understand, and derive meaning from human language in a useful way. Rather than treating text like a sequence of symbols, natural language processing may consider a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like. The analytics platform 102 may utilize natural language processing to grade the set of questionnaire responses, categorize the set of questionnaire responses, cluster the set of questionnaire responses (e.g., cluster similar responses included in the set of questionnaire responses), and/or the like.

In some implementations, the set of questionnaire responses may include hundreds of responses to the set of questionnaires, thousands of responses to the set of questionnaires, tens of thousands of responses to the set of questionnaires, and/or the like. In some implementations, the set of questionnaire responses may include responses to the set of questionnaires transmitted by the data analytics platform 102 to the client device 104 (e.g., one or more employees of the entity associated with the client device 104, one or more customers of the entity associated with the client device 104, and/or the like may provide responses to the set of questionnaires transmitted by the data analytics platform 102 to the client device 104).

In some implementations, the set of questionnaire responses may be responses to a set of questionnaires generated by the client device 104 (or another device associated with the entity that is associated with the client device 104). For example, the entity associated with the client device 104 (e.g., the client entity) may internally generate a set of questionnaires and may receive a set of questionnaire responses through the course of business of the client entity. The set of questionnaires generated by the client entity may include surveys, polls, focus groups, personas, experiential data, Net Promoter Score data, customer satisfaction (CSAT) score data, usage data, and/or the like. In some implementations, the set of questionnaire responses to the set of questionnaires generated by the client entity may be stored by the client entity. The client device 104 may provide the set of questionnaire responses to the set of questionnaires generated by the client entity in response to receiving the set of questionnaires from the data analytics platform 102.

The data analytics platform 102 may utilize natural language processing (or another technique) to adapt or convert the set of questionnaire responses to the set of questionnaires generated by the entity that is associated with the client device 104 to a set of responses to the set of questionnaires transmitted by the data analytics platform 102. For example, the data analytics platform 102 may determine equivalent questions included in the set of questionnaires generated by the entity that is associated with the client device 104 to questions included in the set of questionnaires transmitted by the data analytics platform 102. The data analytics platform may determine a set of questionnaire responses to the set of questionnaires transmitted by the data analytics platform 102 based on adapting or converting the set of questionnaire responses to the set of questionnaires generated by the entity that is associated with the client device 104. As described below, the data analytics platform may form questionnaire response data from the set of questionnaires transmitted by the data analytics platform 102. The questionnaire response data may be input into a machine learning model. Therefore, the data analytics platform 102 conserves resources by converting or adapting the set of questionnaire responses, as the machine learning model does not have to be re-trained or modified to accommodate questionnaire response data associated with the set of questionnaires generated by the entity that is associated with the client device 104. Additionally, the entity that is associated with the client device 104 may conserve resources that would have otherwise been used obtaining the set of questionnaire responses to the set of questionnaires transmitted by the data analytics platform 102.

Figure 1B:
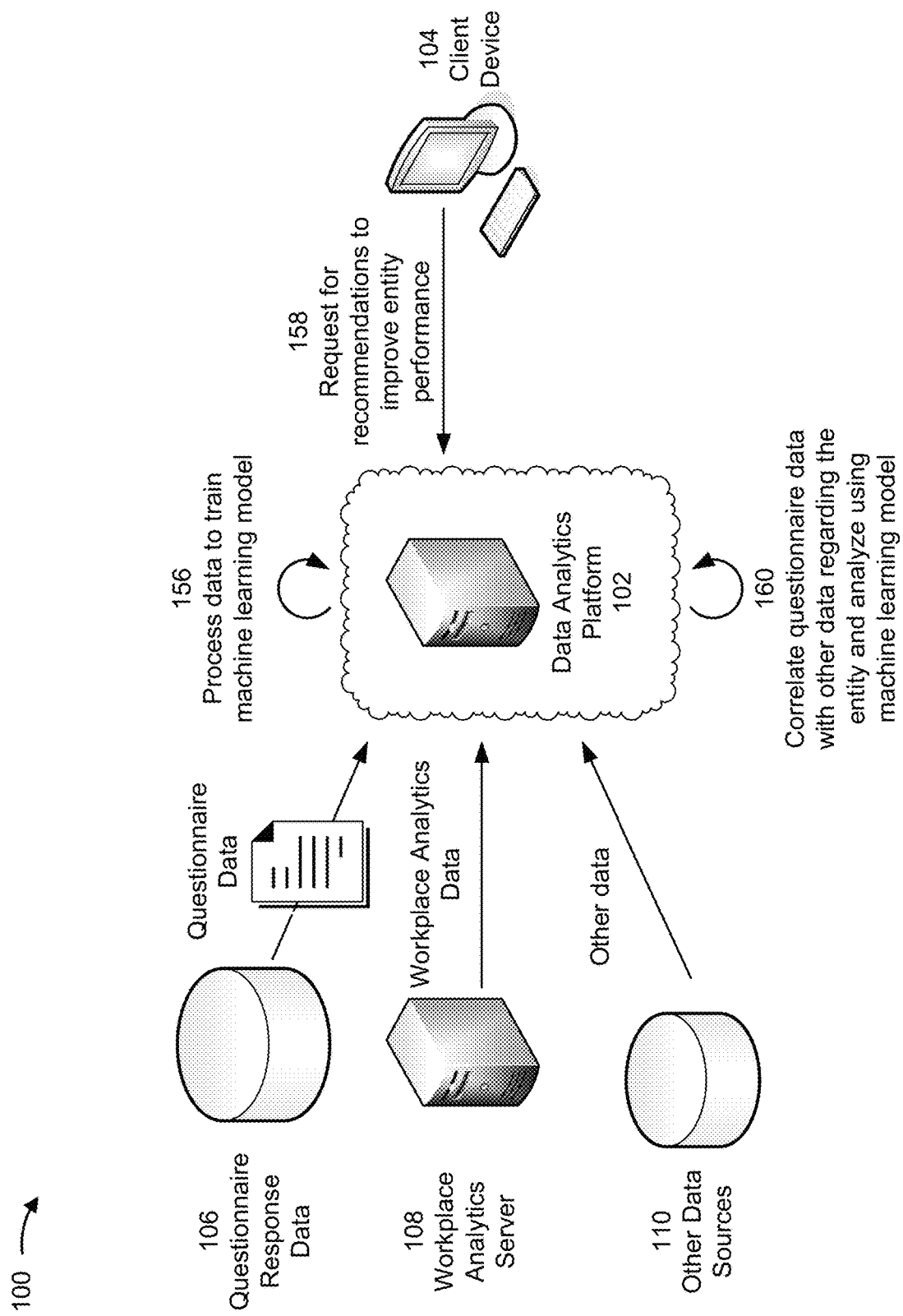

As shown in FIG. 1B, the data analytics platform 102 may obtain questionnaire data from questionnaire response data 106. The questionnaire response data 106 may relate to a customer experience attribute, an employee experience attribute, and/or the like. Further, the questionnaire response data 106 may relate to one or more sub-attributes of the customer experience attribute, one or more sub-attributes of the employee experience attribute, and/or the like. The questionnaire data may be associated with the set of questionnaires transmitted by the data analytics platform 102, the set of questionnaires generated by the client entity, and/or the like. The questionnaire response data 106 may include questionnaire data from a plurality of entities. The data analytics platform 102 may obtain questionnaire data from the plurality of entities in a similar manner as described above with respect to FIG. 1A.

In some implementations, the data analytics platform 102 may process (or pre-process) the questionnaire data obtained from questionnaire response data 106. For example, the data analytics platform 102 may determine a validation level of the questionnaire data, a reliability level of the questionnaire data, a factor structure of the questionnaire data, and/or the like. In some implementations, the data analytics platform 102 may utilize the processed (or pre-processed) questionnaire data as an input to a machine learning model or when training the machine learning model, as described in more detail below.

The data analytics platform 102 may obtain workplace analytics data from a workplace analytics server 108. The workplace analytics data may include data (e.g., metadata) generated by employees of an entity as the employees perform tasks or projects. The workplace analytics data may be stored by the workplace analytics server 108. The workplace analytics server 108 may be associated with the entity, may be associated with an entity that is associated with the data analytics platform 102, and/or the like. The workplace analytics data may include email data (e.g., indicating a quantity of emails sent by employees (e.g., individual employees, all employees, a subset of employees, and/or the like), an amount of time spent drafting emails by employees, and/or the like), work product data (e.g., indicating a quantity of work product produced by employees, an amount of time spent producing work product by employees, and/or the like), call data (e.g., indicating a quantity of calls made by employees (e.g., individual employees, all employees, a subset of employees and/or the like), an amount of time spent on calls by employees, and/or the like), collaboration data (e.g., indicating a quantity of collaborations between employees, a frequency of collaborations between employees, and/or the like), meeting data (e.g., indicating a quantity of meetings conducted by employees (e.g., individual employees, all employees, a subset of employees and/or the like), an amount of time spent in meetings by employees, and/or the like), work time data (e.g., indicating an amount of time spent working by employees, an amount of time spent working by employees outside of normal business hours, and/or the like), work distraction data (e.g., indicating an amount of time employees spend distracted from work, such as by browsing non-work-related websites, taking personal calls, and/or the like), and/or the like.

The data analytics platform 102 may obtain other data from other data sources 110. Other data sources 110 may include social media platforms, transactional data platforms, financial data platforms, third party data sources, primary research platforms, and/or the like. For example, the other data may include social media data. For example, the data analytics platform 102 may remove or scrub social media platforms to obtain social media data such as customer engagement with a social media account of an entity (e.g., clicks, posts, shares, likes, favorites, follows, and/or the like), website traffic, a Net Promoter Score, a sentiment associated with a social media account of an entity, and/or the like. The other data may include employee data (e.g., indicating an amount of time worked by employees, employee reviews, employee salaries, employee diversity, employee tenure, employee interests, job descriptions, skills descriptions, and/or the like), human resources data, customer data (e.g., indicating purchases made by customers, shopping tendencies of customers, and/or the like), transactional data (e.g., indicating transactional data for an entire entity, transactional data for an individual, and/or the like), financial data (e.g., indicating financial data for an entire entity, transactional data for an individual, revenue, sales, assets, turnover, profit, market capitalization, earnings call data, annual financial report data, financial filings data, and/or the like), and/or the like.

For example, the data analytics platform 102 may obtain financial data related to an entity by processing an earnings call associated with the entity. The data analytics platform 102 may obtain a set of call recordings relating to performance of the entity. The data analytics platform 102 may process, using a voice-to-speech processing technique, the set of call recordings to generate a set of call transcripts. The data analytics platform 102 may process, using a natural language processing technique, the set of call transcripts to generate call data.

As shown by reference number 156, the data analytics platform 102 may process the data to train a machine learning model. The data analytics platform 102 may process the questionnaire data, the workplace analytics data, and/or the other data to train a machine learning model. In some implementations, the data analytics platform 102 may process data relating to one or more entities to train the machine learning model. In some implementations, the data analytics platform 102 may train the machine learning model in response to receiving a request for recommendations to improve entity performance of an entity (e.g., as described below).

For example, the data analytics platform 102 may obtain the data relating to the one or more entities. The data analytics platform 102 may divide the data relating to the one or more entities into a training data set and a validation data set. The data analytics platform 102 may train the machine learning model using the training data set. The data analytics platform 102 may validate the machine learning model using the validation set based on training the machine learning model using the training data set.

In some implementations, the data analytics platform 102 may train the machine learning model based on an entity requesting recommendations to improve entity performance. For example, the data analytics platform 102 may train the machine learning model using data of one or more other entities related to the entity requesting recommendations to improve entity performance. In some implementations, the data analytics platform 102 may train the machine learning model before receiving a request for recommendations to improve entity performance.

In some implementations, the data analytics platform 102 may train the machine learning model using a subset of correlations or a subset of other associations among data. For example, the data analytics platform 102 may identify a set of correlations between input data and output data of the machine learning model. The data analytics platform 102 may rank the set of correlations based on a correlation strength. The data analytics platform 102 may select a subset of the set of correlations for a set of features. The data analytics platform may run the model using the subset of the set of correlations (e.g., to determine a feature rank, an influence threshold, and/or the like, as described in more detail below). As a result, the data analytics platform 102 may conserve resources that would have otherwise been used to run the model using the entire set of correlations.

In some implementations, the data analytics platform 102 may train the machine learning model using at least one of a clustering technique, a polynomial regression technique, a natural language processing technique, a topic modeling technique, an artificial intelligence technique, a neural network technique, a pattern recognition technique, and/or the like. The training of the machine learning model is discussed in more detail below with respect to FIG. 2.

As shown by reference number 158, the data analytics platform 102 may receive a request for recommendations to improve entity performance from the client device 104. The request for recommendations to improve entity performance from the client device 104 may be received via a user interface of the client device 104. In some implementations, the request for recommendations to improve entity performance from the client device 104 may be received before the data analytics platform 104 provides the set of questionnaires to the client device 104 (e.g., as described above with respect to FIG. 1A).

As shown by reference number 160, the data analytics model 102 may correlate questionnaire data with other data regarding the entity and analyze the correlated data using the machine learning model. For example, the data analytics model 102 may correlate the set of questionnaire responses with contextual data relating to the entity. In some implementations, the data analytics model 102 may aggregate data associated with the entity (e.g., questionnaire data, workplace analytics data, other data, and/or the like). In some implementations, the contextual data may refer to a set of key performance indicators (KPIs) associated with the entity. The set of KPIs may be based on an industry associated with the entity (e.g., the KPIs may be based on metrics used to evaluate entities that are similar to the entity). The set of KPIs may be based on internal KPIs associated with the entity. The set of KPIs may include financial indicators (e.g., sales growth, stock price, gross profit margin, net cash flow, and/or the like), customer attrition (e.g., customer loss and/or retention), sales pipeline (e.g., indicating data associated with the stages of sales within the entity), sales performance, and/or other data related to the entity. The data analytics platform 102 may correlate the aggregated data associated with the entity with the contextual data associated with the entity.

In some implementations, the data analytics model 102 may implement a data cleansing method (e.g., to obtain and/or preprocess the questionnaire data, the workplace analytics data, the other data, and/or the like). In some implementations, the data analytics model 102 may utilize the data cleansing method to filter meaningless words, phrases, and/or sentences from the data. The data cleansing method may include detecting the meaningless words, phrases, and/or sentences, and then deleting the meaningless words, phrases, and/or sentences. The data cleansing method may detect and delete meaningless words, phrases, and/or sentences caused by user entry errors, by corruption in transmission or storage, by natural language processing errors, and/or the like.

In some implementations, correlating the questionnaire data with other data regarding the entity may include one or more of lemmatization (e.g., determining a dictionary form of a word based on the word's meaning); morphological segmentation (e.g., separating words into individual grammatical units and identifying a class (or classes) of the grammatical units); part-of-speech tagging (e.g., given a sentence, determining a part of speech for each word in the sentence, such as a noun, a verb, and/or the like); parsing (e.g., determining relationships between words in a sentence and performing a grammatical analysis of the sentence); sentence breaking (e.g., given a block of text, determining sentence boundaries in the block of text based on punctuation marks); stemming (e.g., reducing inflected or derived words to their word stem, base, or root form); word segmentation (e.g., separating a block of continuous text into separate words); terminology extraction (e.g., automatically extracting relevant terms from a corpus); lexical semantics (e.g., determining a computational meaning of individual words in context); machine translation (e.g., automatically translating text from one human language to another human language); named entity recognition (e.g., given a block of text, determining which items in the text map to proper names, such as people or places, and determining a type of each proper name, such as a person, a location, an organization, and/or the like); natural language generation (e.g., converting information from machine-readable form into readable human language); natural language understanding (e.g., converting text into more formal representations, such as first-order logic structures that are easier for computer programs to manipulate); optical character recognition (e.g., determining corresponding text from an image representing printed text); question answering (e.g., determining an answer to a human-language question); recognizing textual entailment (e.g., given two text fragments, determining if one text fragment being true causes negation of the other text fragment or allows the other text fragment to be either true or false); relationship extraction (e.g., identifying relationships among named entities in text); sentiment analysis (e.g., extracting subjective information from documents to determine sentiments about specific subjects); topic segmentation and recognition (e.g., separating text into segments devoted to different topics, and identifying the topic of each segment); word sense disambiguation (e.g., selecting a meaning of a word that makes the most sense in context); coreference resolution (e.g., determining words that refer to the same objects); discourse analysis (e.g., identifying discourse structure of connected text); and/or the like. In some implementations, the techniques recited above may be utilized in other aspects described herein, such as when performing natural language processing and/or the like.

Figure 1C:
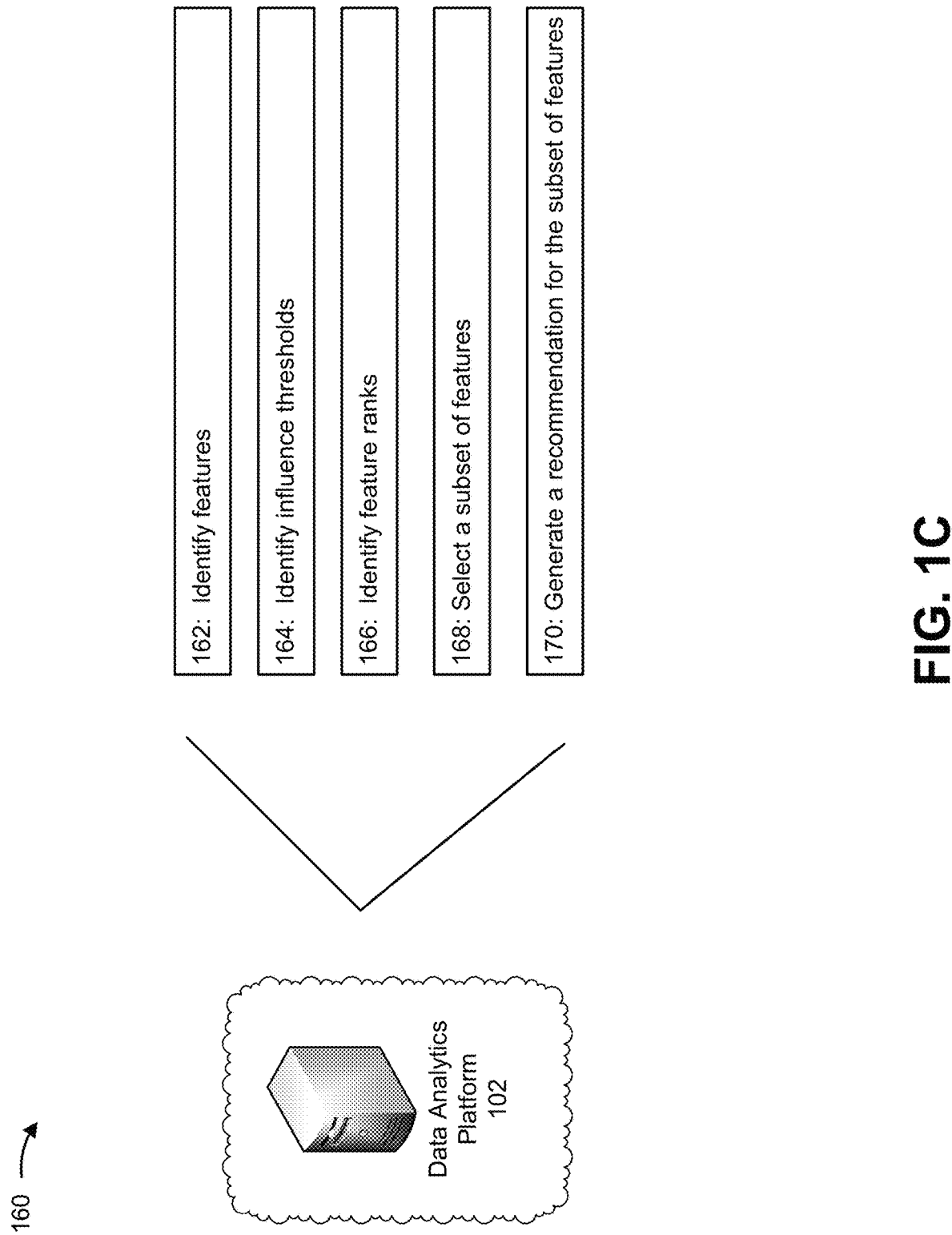

As shown in FIG. 1C, and by reference number 162, the data analytics platform 102 may analyze the correlated data using the machine learning model to identify a set of features. The set of features may be associated with at least one of the internal entity experience attribute or the external entity experience attribute (e.g., as described above with respect to FIG. 1A). For example, a feature, of the set of features, may correspond to at least one sub-attribute described above with respect to FIG. 1A. A feature may be associated with features determined or identified when training the machine learning model (e.g., a feature may be something that impacts or changes the output of the machine learning model).

As shown by reference number 164, the data analytics platform 102 may identify a set of influence thresholds corresponding to the set of features. For example, each feature included in the set of features may be associated with an influence threshold. An influence threshold may be a feature rank (e.g., a ordinal rank, an influence level, and/or the like) at which a feature starts (or stops) impacting an output of the machine learning model. For example, each feature may be ranked by the machine learning model. A feature rank may indicate the performance or quality, for the feature, of an entity with respect to one or more other entities (e.g., one or more peer entities, one or more competitor entities, the one or more entities used to train the machine learning model, and/or the like). For example, a feature may be ranked on a score of 1-100 (e.g., where a feature rank of 1 is poor, a feature rank of 50 is average, and a feature rank of 100 is excellent). The data analytics platform 102 may determine that a feature does not begin to impact an output of the machine learning model until the feature rank of the feature reaches a certain level (e.g., the data analytics platform 102 may determine that the feature does not begin to impact an output of the machine learning model until the feature rank reaches 55). Similarly, the data analytics platform 102 may determine that a feature stops impacting an output of the machine learning model after the feature rank of the feature exceeds a certain level (e.g., the data analytics platform 102 may determine that the feature stops impacting an output of the machine learning model after the feature rank of the feature exceeds 95).

As described herein, an influence threshold may refer to a feature rank at which a feature starts to impact the output of the machine learning mode, a feature rank at which a feature stops impacting the output of the machine learning mode, or a combination thereof (e.g., a range from the feature rank at which the feature starts to impact the output of the machine learning mode to the feature rank at which the feature stops impacting the output of the machine learning mode).

For example, for a feature, the data analytics model 102 may determine that below an influence threshold the feature does not impact business performance (e.g., financial performance) of an entity. That is, if the influence threshold is 55 and a current feature rank is 35, the data analytics model 102 may determine that even if the feature rank is increased from 35 to 50, the financial performance of the entity may not be impacted or may be minimally impacted. The data analytics model 102 may determine that above a feature rank of 55 (e.g., the influence threshold associated with the feature), the feature may begin to incrementally impact the financial performance of the entity as the feature rank of the feature is improved.

In some implementations, an influence threshold may be a feature rank of a feature below which the feature begins to impact an output of the machine learning model. An influence threshold may be a feature rank of a feature below which, for example, the feature begins to negatively impact a financial performance of an entity. For example, if the influence threshold for a feature is 25, as long as the feature rank of the feature is above 25, the feature may not impact (or may have a minimal impact on) the financial performance of the entity. However, if the feature rank of the feature falls below 25, the feature may begin to negatively impact the financial performance of the entity.

As shown by reference number 166, the data analytics platform 102 may identify a set of feature ranks, corresponding to the set of features, based on analyzing the data associated with the entity using the machine learning model. As described above, a feature rank may indicate the performance of the entity for the feature with respect to one or more other entities. A feature rank may be a numeric rank (e.g., on a scale of 0 to 10, on a scale of 0 to 100, on a scale of 0 to 1000, and/or the like). In some implementations, a feature rank may be a grade rank (e.g., a letter grade, such as from F to A, and/or the like). The data analytics platform 102 may identify the set of feature ranks by inputting the data (e.g., the correlated data described above with respect to reference number 160, questionnaire data associated with the entity, workplace analytics data associated with the entity, other data associated with the entity, and/or the like) into the machine learning model and identifying the set of feature ranks based on one or more outputs of the machine learning model.

In some implementations, the data analytics platform 102 may identify an influence level associated with a feature rank of a feature. That is, the data analytics platform 102 may identify a level or an amount that a feature is contributing to an output of the machine learning model, a level or an amount that a feature is impacting the financial performance of the entity, and/or the like. For example, a specific feature's contribution or impact to an output of the machine learning model (and/or to the financial performance of the entity) may not be linear (e.g., as a feature rank of a feature changes, the feature may have a different level of influence on an output of the machine learning model and/or on the financial performance of the entity). In other words, for a given feature, a change from a first feature rank to a second feature rank may have little to no impact on an output of the machine learning model and/or on the financial performance of the entity (e.g., if the first feature rank and the second feature rank do not satisfy an influence threshold associated with the feature). However, in some cases, for the feature, a change from a third feature rank to a fourth feature rank may have a larger impact on an output of the machine learning model and/or on the financial performance of the entity (e.g., if the third feature rank and/or the fourth feature rank do satisfy the influence threshold associated with the feature).

As a result, each feature may be associated with an influence level which indicates a level or an amount that the feature is contributing to an output of the machine learning model, a level or an amount that the feature is impacting the financial performance of the entity, and/or the like. Therefore, as referred to herein, a feature rank may indicate the performance of the entity for the feature with respect to one or more other entities, may indicate an influence level associated with the feature, and/or the like.

In some implementations, the data analytics platform 102 may identify an overall feature rank by combining one or more feature ranks. For example, the data analytics platform 102 may identify an overall employee experience feature rank determined by the machine learning model from the feature ranks of features related to the sub-attributes of the employee experience attribute. The data analytics platform 102 may identify an overall customer experience feature rank determined by the machine learning model from the feature ranks of features related to the sub-attributes of the customer experience attribute.

As shown by reference number 168, the data analytics platform 102 may select a subset of features from the set of features. The data analytics platform 102 may select the subset of features based on the set of feature ranks. The data analytics platform 102 may select the subset of features based on the set of influence thresholds. For example, the data analytics platform 102 may identify features that have feature ranks that satisfy corresponding influence thresholds. The subset of features may include features that have feature ranks that satisfy corresponding influence thresholds. In some implementations, the data analytics platform 102 may identify features that have feature ranks that are within a threshold of corresponding influence thresholds (e.g., features that have feature ranks that do not satisfy corresponding feature thresholds, but are close to the corresponding feature thresholds). The subset of features may include features that have feature ranks that are within a threshold of corresponding influence thresholds. In some implementations, the subset of features may include only a single feature.

In some implementations, the data analytics platform 102 may select the subset of features based on determining one or more features that, if the feature rank is changed, will have a largest impact on a financial performance of an entity. In some implementations, the data analytics platform 102 may select the subset of features based on determining one or more features that, if the feature rank is changed, will have a largest impact on a financial performance of an entity with a lowest output of resources (e.g., computing resources, time resources, financial resources, and/or the like) by the entity. For example, the data analytics platform 102 may generate a resource cost of changing the feature rank of a feature. The data analytics platform 102 may generate an estimated result of changing the feature rank (e.g., an impact on an output of the machine learning model, an impact on a financial performance of an entity, and/or the like). In this way, the data analytics platform may identify the subset of features that may result in the largest result from changing the feature ranks with the lowest resource cost. In other words, the data analytics platform 102 may perform a cost-benefit analysis of a resource cost associated with improving a feature rank of a feature and a benefit that would be yielded from improving the feature rank of the feature (e.g., based on how close the feature rank is to an influence threshold, based on an impact on an output of the machine learning model, and/or the like). This conserves resources that would have otherwise been used changing the feature ranks of features that may satisfy an influence threshold, but may have a relatively low result from changing the feature rank, with a relatively high resource cost.

For example, the data analytics platform 102 may identify that a feature has a feature rank of 65 (e.g., using the machine learning model). The data analytics platform 102 may identify that the feature is associated with an influence threshold of 60. The data analytics platform 102 may determine, as the feature rank of the feature satisfies the influence threshold, that if the feature rank of the feature is improved (e.g., to 70 and/or the like) the financial performance of the entity may be improved. As a result, the data analytics platform 102 may select the feature to be included in the subset of features.

In some implementations, the data analytics platform 102 may identify that a feature has a feature rank of 45 (e.g., using the machine learning model). The data analytics platform 102 may identify that the feature is associated with an influence threshold of 65. The data analytics platform 102 may determine that for the entity to improve the feature rank of the feature from 45 to 65 (e.g., the point at which the feature will begin to impact financial performance of the entity) may require significant resource overhead from the entity with no or little impact to the financial performance of the entity. As a result, the data analytics platform 102 may not select the feature to be included in the subset of features. In this way, the data analytics platform 102 conserves resources (e.g., computing resources, time resources, financial resources, and/or the like) that would have otherwise been used by the entity improving the feature rank of the feature until the feature rank satisfied the influence threshold.

In some implementations, the subset of features may include features that together most positively impact an experience attribute (e.g., that if the feature rank of each feature included in the subset of features is improved, the entity will realize the largest positive impact on financial performance). In some implementations, the subset of features may include features that together most negatively impact an experience attribute. For example, the data analytics platform 102 may identify a subset of features that are most negatively impacting financial performance of the entity. In some implementations, the data analytics platform 102 may identify a subset of features that, if feature ranks of features included in the subset of features are decreased, would have the largest negative impact on an experience attribute and/or on the financial performance of the entity.

As shown by reference number 170, the data analytics platform 102 may generate a recommendation for the subset of features. The data analytics platform 102 may generate a set of recommendations associated with the subset of features, wherein each recommendation is associated with improving a feature rank, of the set of feature ranks, associated with a feature, of the subset of features. The data analytics platform 102 may process information relating to the subset of features to generate the set of recommendations associated with the subset of features. A recommendation may include data that identifies one or more tasks to be performed to change a feature rank of a feature, one or more actions to be performed to change a feature rank of a feature, one or more modifications to process(es) performed by the entity to change a feature rank of a feature, one or more processes for the entity to prioritize to change a feature rank of a feature, one or more processes to be implemented to change a feature rank of a feature, and/or the like.

The data analytics platform 102 may generate the set of recommendations associated with the subset of features based on historical recommendations. For example, the data analytics platform 102 may process historical recommendations and/or historical business action data to train a recommendation engine (e.g., a machine learning model, an artificial intelligence model, and/or the like). The data analytics platform 102 may train the recommendation engine in a similar manner as described above with respect to reference number 156 and/or in a similar manner as described below with respect to FIG. 2. The data analytics platform 102 may utilize the recommendation engine to map the data associated with the entity to previous data to identify similar entities (e.g., in a similar field, a similar business, and/or the like). The data analytics platform 102 may utilize the recommendation engine to identify recommendations associated with the subset of features that have been implemented by the identified similar entities. The data analytics platform 102 may analyze an impact to an output of the machine learning model, an impact on financial performance of the identified similar entities, and/or the like that the recommendations caused after being implemented. The data analytics platform 102 may generate the set of recommendations associated with the subset of features based on identifying past recommendations that had a positive impact to an output of the machine learning model, a positive impact on financial performance of the identified similar entities, and/or the like.

For example, a recommendation may be to implement a process or tool for improving an employee experience attribute, a customer experience attribute, and/or the like. In some implementations, a recommendation may be to install a tool (e.g., a communication tool, a collaboration tool, an automation tool, an artificial intelligence tool, an efficiency tool, and/or the like) on a server associated with the entity to be available for employees of the entity. In some implementations, a recommendation may be to provide a training program for employees of the entity. In some implementations, a recommendation may be to implement a process or tool on a customer interface of the entity (e.g., to increase customer engagement, to increase customer feedback, to demonstrate innovation to customers, to reassure customers of privacy and/or security levels associated with the customer interface, and/or the like). In some implementations, a recommendation may be to implement a process or tool for providing feedback to employees. These recommendations are provided merely as examples. A recommendation may be any task, process, point of emphasis, and/or the like that may change a feature rank of a feature.

Figure 1D:
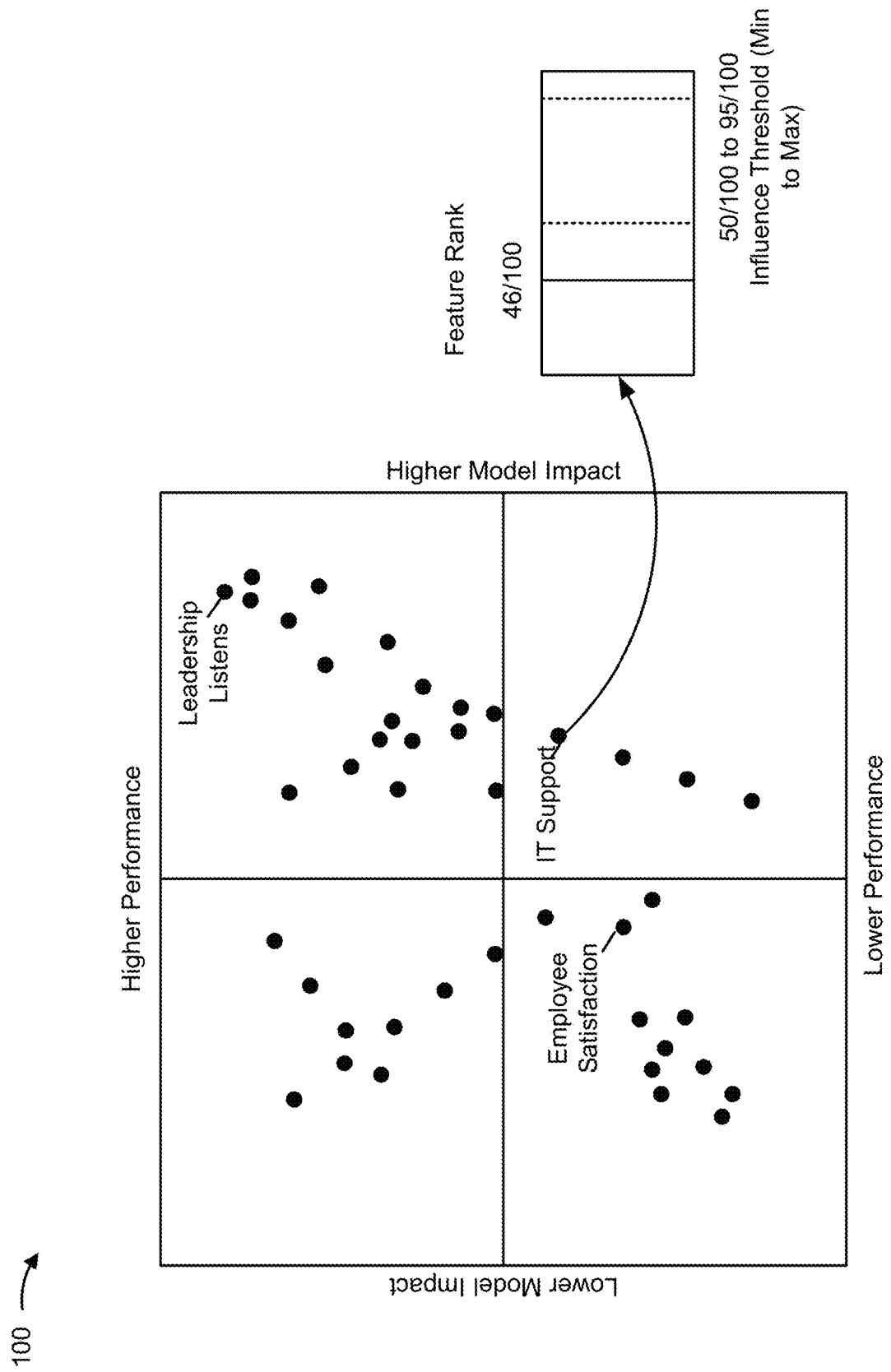

As shown in FIG. 1D, the data analytics platform 102 may generate a graph or a plot identifying features and corresponding feature ranks. The plot may display features plotted by feature rank along the y-axis or the vertical axis (e.g., from lower performance to higher performance). The plot may display features plotted by machine learning model impact on the x-axis or the horizontal axis (e.g., from lower model impact to higher model impact). "Machine learning model impact" may refer to changes in an output of the machine learning model based on modifying a feature rank of a feature.

The plot may create entries or data points for a plurality of features. As described above, each feature may be associated with one or more sub-attributes of an experience attribute. For example, a plot may be associated with the customer experience attribute and each data point may be associated with one or more sub-attributes of the customer experience attribute. In some implementations, a plot may be associated with the employee experience attribute and each data point may be associated with one or more sub-attributes of the employee experience attribute.

The data analytics platform 102 may identify the influence threshold associated with each feature included in the plot. For example, as shown in FIG. 1D, the data analytics platform 102 may identify, using the machine learning model, that a feature of information technology (IT) support has a feature rank of 46 out of 100 (e.g., on a scale from 0 to 100 and/or the like). The data analytics platform 102 may identify that the feature of IT support has an influence threshold that starts at a feature rank of 50 out of 100 and ends at 95 out of 100 (e.g., the feature of IT support starts to impact the machine learning model output (or a financial performance of an entity) at a feature rank of 50 and stops impacting the machine learning model output at a feature rank of 95).

As a result, in some implementations, the data analytics platform 102 may select the feature of IT support to be included in the subset of features (e.g., as described above with respect to FIG. 1C) as the current feature rank of IT support is close to the minimum influence threshold feature rank (e.g., an increasing the feature rank of IT support from 46 to above 50 may positively impact the machine learning model output or may positively impact financial performance of the entity). In some implementations, the data analytics platform 102 may select the feature of IT support to be included in the subset of features based on a resource cost of increasing the feature rank of IT support from 46 to above 50 (e.g., increasing the feature rank of IT support to above the minimum influence threshold feature rank may be associated with a low resource cost).

In some implementations, the data analytics platform 102 may not select the feature of IT support to be included in the subset of features because the current feature rank of IT support does not satisfy the influence threshold. In some implementations, the data analytics platform 102 may not select the feature of IT support to be included in the subset of features based on the resource cost of increasing the feature rank of IT support from 46 to above 50 (e.g., increasing the feature rank of IT support to above the minimum influence threshold feature rank may be associated with a high resource cost). In this way, the data analytics platform 102 may conserve resources that would have otherwise been used due to the high resource cost of increasing the feature rank of IT support to satisfy the influence threshold.

Figure 1E:
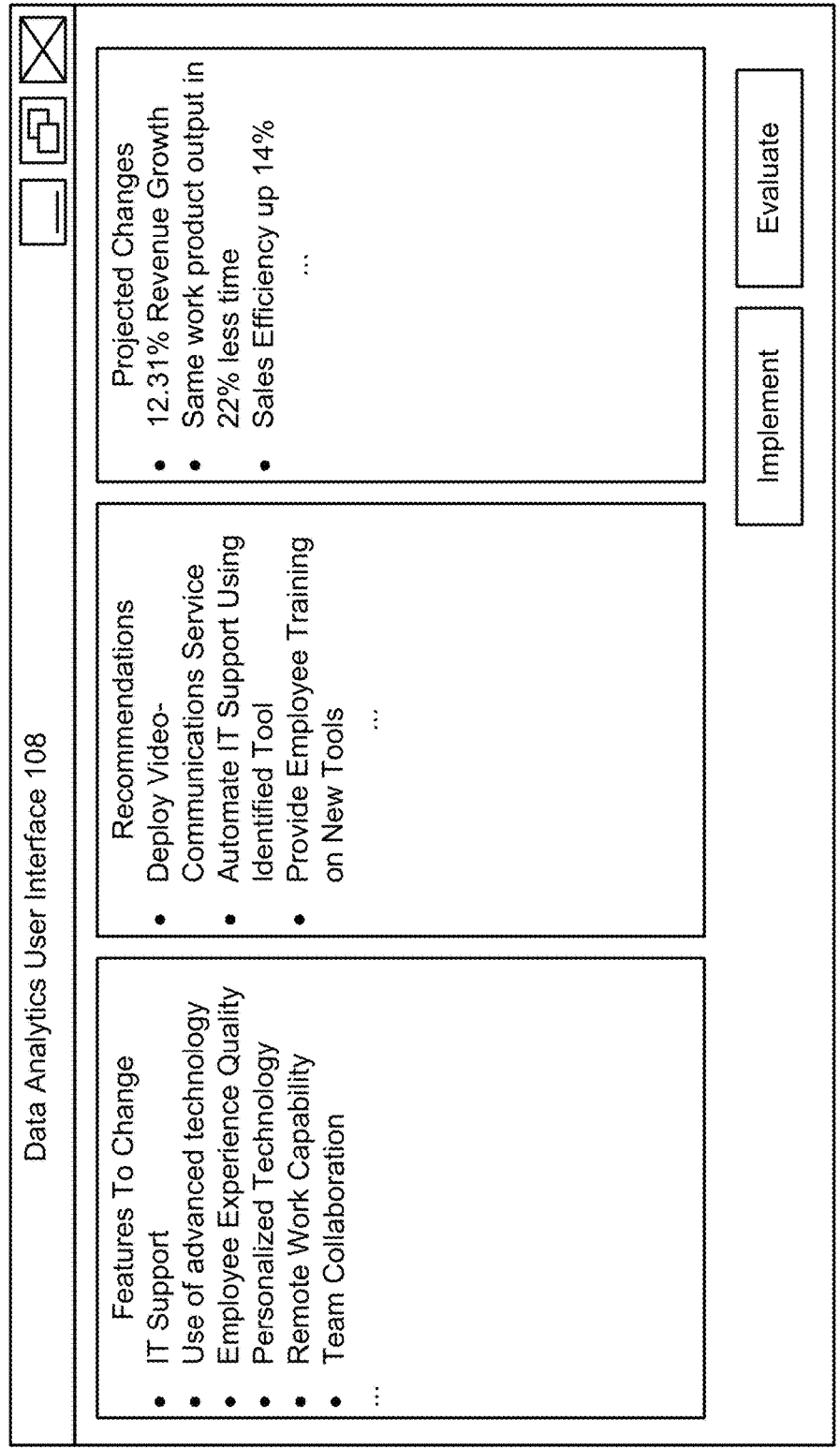

As shown in FIG. 1E, the data analytics platform 102 may provide a user interface for displaying the outputs of the machine learning model, the subset of features identified by the data analytics platform 102, the set of recommendations, projected changes based on implementing the set of recommendations, and/or the like. The user interface may be provided on a client device 104 or on another device. The user interface may be a dashboard user interface. For example, the data analytics platform 102 may generate the dashboard user interface that includes information associated with the subset of features. The data analytics platform 102 may provide the dashboard user interface for display.

The data analytics platform 102 may provide projected changes that are based on an impact of implementing one or more recommendations provided by the data analytics platform 102. For example, a projected change may be an increase in revenue growth for the entity. Another projected change may be an increase in efficiency of work product produced by employees. For example, the data analytics platform 102 may determine that, if the recommendations are implemented, employees of the entity may produce the same work product in less time. As a result, computing resources, processing resources, networking resources, and/or the like may be conserved as employees of the entity are enabled to work less for the same amount of work, thereby consuming less computing resources, processing resources, network resources, and/or the like. Another projected change may be that sales efficiency is increased. For example, the data analytics platform 102 may determine that, if the recommendations are implemented, customers may be enabled to purchase products and/or services from the entity more efficiently. As a result, computing resources, processing resources, networking resources, and/or the like may be conserved as customers will consume less resources to purchase products and/or services from the entity.

Another projected change may be that employees feel more connected or included within the entity (e.g., as a result of improving diversity, inclusion, positive feedback, sharing success stories, and/or the like). As a result, employees may be more productive when completing work for the entity. Therefore, computing resources, processing resources, networking resources, and/or the like may be conserved as employees will consume less resources when working more productively. Another projected change may be that security and/or privacy of one or more platforms provided by the entity is increased. As a result, customers may feel more secure when using the one or more platforms and may be more likely to purchase from the entity and/or use the one or more platforms (e.g., thereby increasing revenue and/or profit for the entity). Additionally, or alternatively, computing resources, processing resources, networking resources, and/or the like may be conserved that would have otherwise been used to identify fraudulent acts on the one or more platforms, remedy the fraudulent acts, and/or the like.

In some implementations, the data analytics platform 102 may communicate with one or more other devices or one or more other systems (e.g., one or more client devices 104 or one or more other devices) to implement the set of recommendations based on generating the set of recommendations. For example, the data analytics platform may receive, based on providing the user interface for display, an input confirming one or more recommendations. The data analytics platform may communicate with one or more other devices or one or more other systems to implement the one or more recommendations based on receiving the input.

In some implementations, the data analytics platform 102 may receive, via the user interface, input identifying an alteration to a recommendation provided by the data analytics platform 102 (e.g., the input may cancel the recommendation, modify the recommendation, choose a different recommendation, and/or the like). For example, the alteration may include a second recommendation. The data analytics platform 102 may communicate with one or more other devices or one or more other systems to implement the second recommendation based on receiving the input. The data analytics platform 102 may feed or input the second recommendation back into the recommendation engine (e.g., as described above with respect to FIG. 1C) to update the recommendation engine. In this way, the data analytics platform 102 may improve the accuracy of the recommendation engine in real time. Moreover, the data analytics platform 102 may improve the accuracy of the recommendation engine faster using feedback provided via the user interface, thereby conserving computing resources, processing resources, and/or the like that would have otherwise been used training the recommendation engine without the feedback provided via the user interface.

In some implementations, the data analytics platform 102 may automatically implement the set of recommendations (or automatically implement one or more recommendations included in the set of recommendations). For example, a recommendation may be for the entity to implement a tool (e.g., a program, a system, a service, an application, a platform, an automation tool, an interface (e.g., an application programming interface and/or the like), firmware, software, and/or the like). The data analytics platform 102 may search an index of a tool database. The data analytics platform 102 may identify a tool, in the index of the tool database, that matches the recommendation. The data analytics platform 102 may provide the tool, from the tool database, to a server (e.g., associated with the entity). The data analytics platform 102 may install the tool in the server or cause the tool to be installed in the server. In this way, the data analytics platform 102 may automatically implement a recommendation, conserving computing resources, networking resources, processing resources, and/or the like that would have otherwise been used by the entity searching for a tool associated with the recommendation, identifying a tool associated with the recommendation, and implementing the tool.

In some implementations, the data analytics platform 102 may automatically schedule a meeting to discuss the set of recommendations. For example, the data analytics platform 102 may identify scheduling data for a set of stakeholders (e.g., executives of the entity, directors of the entity, supervisors of the entity, and/or the like). The data analytics platform 102 may generate a calendar event based on the scheduling data. The data analytics platform 102 may communicate with a set of client devices (e.g., a set of client devices 104) of the set of stakeholders to store the calendar event in respective calendars of the set of client devices. In this way, the data analytics platform 102 conserves computing resources, networking resources, processing resources, and/or the like that would have otherwise been used to communicate schedule availability of the stakeholders between client devices 104, schedule a calendar event, generate the calendar event, communicate among the client devices to store the calendar event, and/or the like.

In some implementations, the data analytics platform 102 may automatically create or provide training programs based on the set of recommendations. For example, the data analytics platform 102 may identify a training program for a set of employees of the entity based on a recommendation. The data analytics platform 102 may provide, via a user interface, the training program to a set of client devices associated with the set of employees. A training program may be associated with a tool that is implemented based on a recommendation by the data analytics platform 102 (e.g., training the set of employees on how to use the tool). A training program may be associated with a customer experience sub-attribute or an employee experience sub-attribute (e.g., a training program may train the set of employees to increase collaboration, increase diversity, increase efficiency, and/or the like).

In some implementations, the data analytics platform 102 may automatically schedule the set of employees for attendance at a training program, may schedule an occurrence of the training program, may identify a topic for the set of employees to self-study, and/or the like. In some implementations, the data analytics platform 102 may identify the set of employees based on workplace analytics data associated with the entity. For example, the data analytics platform 102 may determine whether an employee has a threshold level of proficiency in an area associated with the training program, may identify employees that will need to use a tool associated with the training program, and/or the like.

In some implementations, the data analytics platform 102 may re-assess, after automatically implementing the set of recommendations, data associated with the entity (e.g., questionnaire data, workplace analytics data, other data, and/or the like) using the machine learning model. The data analytics platform 102 may generate, based on re-assessing the data, a new recommendation. The data analytics platform 102 may automatically implement the new recommendation. In some implementations, the data analytics platform 102 may train (e.g., re-train) the machine learning model based on the result of the re-assessment (e.g., based on determining whether a prediction or an output provided by the machine learning model was correct). In this way, the data analytics platform 102 may continually improve the machine learning model based on recommendations implemented by the data analytics platform 102.

As a result, the data analytics platform 102 identifies features of an internal experience attribute or an external entity experience attribute that, if improved, will impact the internal entity experience attribute or the external entity experience attribute (e.g., will impact an output of the machine learning model). The data analytics platform 102 generates recommendations for improving the identified features and may communicate, with one or more other devices, to implement the recommendations. This conserves resources that would have otherwise been used researching/identifying the different features of the experience attribute, identifying different actions that may be taken or tasks to improve the different features of the experience attribute, implementing one or more actions and/or tasks in an attempt to improve the experience attribute, and/or the like. Additionally, this conserves resources that would have otherwise been used blindly choosing features of the experience attribute to improve that may not have an impact (or may have a small impact) on the overall level or rank of the experience attribute (e.g., an output of the machine learning model, the financial performance of an entity, and/or the like).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
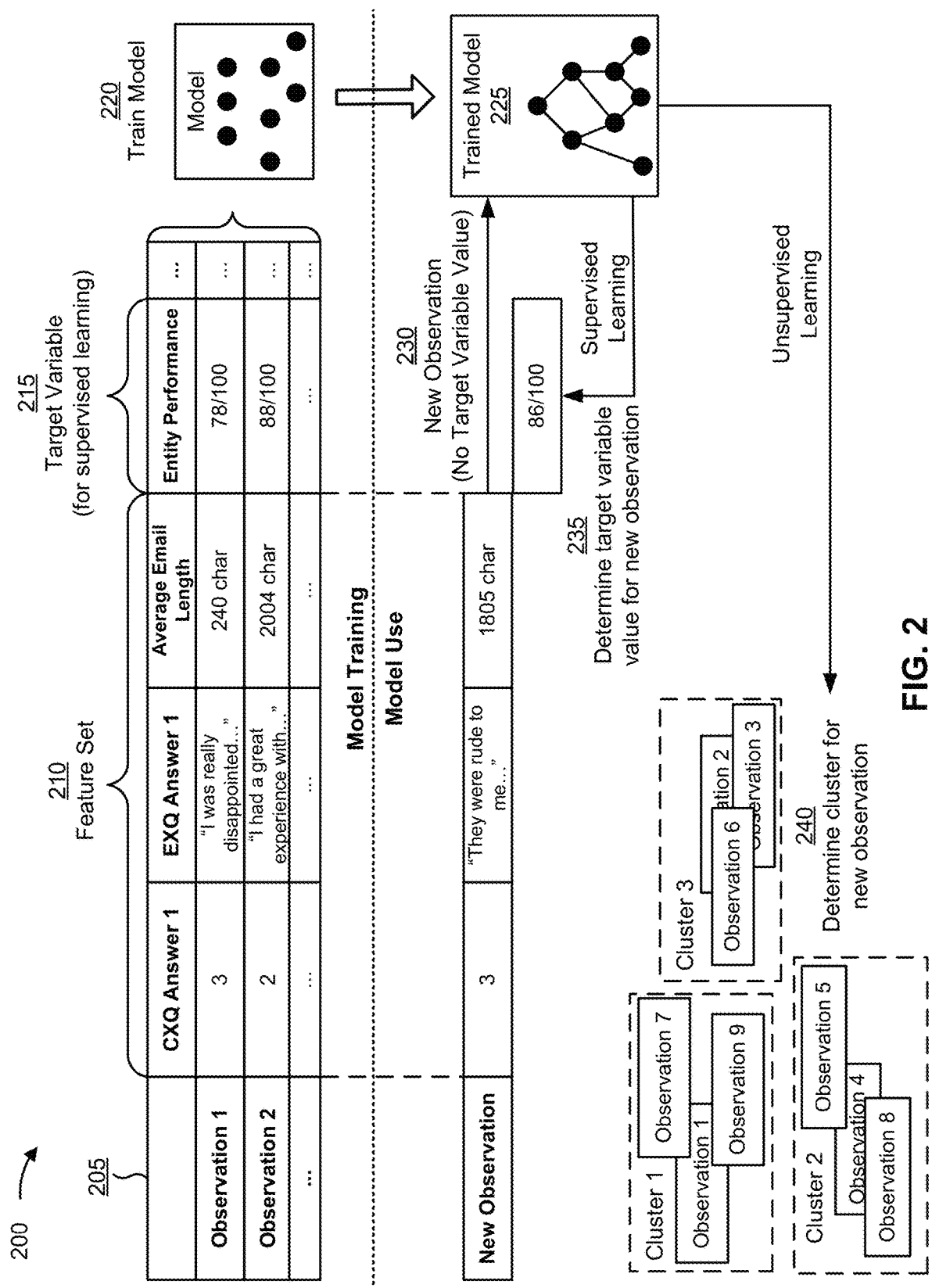
FIG. 2 is a diagram illustrating an example of training and using a machine learning model in connection with an analytics-driven recommendation engine.

FIG. 2 is a diagram illustrating an example 200 of training and using a machine learning model in connection with an analytics-driven recommendation engine. The machine learning model training and usage described herein may be performed using a machine learning system. The machine learning system may include or may be included in a computing device, a server, a cloud computing environment, and/or the like, such as the data analytics platform described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from a data analytics platform, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data analytics platform. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a customer experience questionnaire (CXQ) answer 1, a second feature of an employee experience questionnaire (EXQ) answer 1, a third feature of average email length, and so on. As shown, for a first observation, the first feature may have a value of 3, the second feature may have a value of "I was really disappointed . . . ", the third feature may have a value of 240 characters, and so on. These features and feature values are provided as examples, and may differ in other examples. For example, the feature set may include one or more of the following features: employee satisfaction rating, customer satisfaction rating, a customer perceived usability answer or rating, a customer perceived value answer or rating, a customer perceived risk answer or rating, a customer convenience answer or rating, a technical innovation answer or rating, a functional quality answer or rating, a service quality answer or rating, a customer to employee engagement answer or rating, a brand trust answer or rating, a customer loyalty answer or rating, a Net Promoter Score, an overall customer experience answer or rating, an activity in social media answer or rating, an employee collaboration answer or rating, an employee creativity answer or rating, an employee empowerment answer or rating, an employee diversity answer or rating, an employee personal financial health answer or rating, an employee personal growth answer or rating, a leadership/direct supervisor answer or rating, an employee belief in company competitiveness answer or rating, an overall employee experience answer or rating, a technology work complexity answer or rating, a process work complexity answer or rating, an employee culture answer or rating, an employee self-efficacy answer or rating, a workplace analytics rating, an average employee salary, an average amount of time employees spend working, an average amount of time employees spend working outside of normal business hours, an employee efficiency rating, an entity financial health rating, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is entity performance, which has a value of 78 out of 100 for the first observation (e.g., with respect to other related entities, where 0 is poor, 50 is average, and 100 is the best). The target variable may be used to generate recommendations, identify influence thresholds of features, and/or the like (e.g., as described above with respect to FIGS. 1A-1E).

The feature set and target variable described above are provided as examples, and other examples may differ from what is described above. For example, for a target variable of customer experience performance, the feature set may include features related to sub-attributes of a customer experience attribute, as described above with respect to FIGS. 1A-1E. For a target variable of employee experience performance, the feature set may include features related to sub-attributes of an employee experience attribute, as described above with respect to FIGS. 1A-1E. For a target variable of financial performance of an entity, the feature set may include features related to financial data, transactional data, workplace analytics data, sub-attributes of an employee experience attribute, sub-attributes of a customer experience attribute, and/or the like. For a target variable of recommendation effectiveness (e.g., indicating an impact of a recommendation on a customer experience rating, on an employee experience rating, on a financial performance of the entity, and/or the like), the feature set may include features related to a customer experience overall rating, a feature rating, an employee experience overall rating, a recommendation type, a recommendation, and/or the like. For a target variable of an entity performance for a specific feature (e.g., related to a sub-attribute of an experience attribute), the feature set may include data related to the specific feature.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of CXQ answer 1, a second feature of EXQ answer 1, a third feature of average email length, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of 86 out of 100 for the target variable of entity performance for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, implementing a tool, proving a training program, implementing a process for employees, and/or the like. The first automated action may include, for example, automatically installing the tool on one or more devices associated with the entity, automatically providing or scheduling a training program for one or more employees of the entity, automatically providing or implementing a process on one or more devices associated with the entity, and/or the like.

As another example, if the machine learning system were to predict a value of 98 out of 100 for the target variable of entity performance, then the machine learning system may provide a second (e.g., different) recommendation (e.g., to not attempt to improve a feature rank of a feature and/or the like, as improving the feature with a value of 98 out of 100 may not result in an increase in financial performance of the entity).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., associated with features that satisfy an influence threshold, as described above with respect to FIGS. 1A-1E), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., associated with features that do not satisfy an influence threshold associated with the feature), then the machine learning system may provide a second (e.g., different) recommendation (e.g., to not attempt to improve a feature rank of the features included in the second cluster). As another example, if the machine learning system were to classify the new observation in a third cluster (e.g., associated with features that have a low resource cost associated with modifying a feature rank of the feature, as described above with respect to FIGS. 1A-1E), then the machine learning system may provide the first recommendation, as described above. Additionally, or alternatively, the machine learning system may perform an automated action and/or may cause an automated action to be performed (e.g., by instructing another device to perform the automated action) based on classifying the new observation in the third cluster, such as the first automated action described above.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), such as a machine learning model influence threshold, may be based on a cluster in which the new observation is classified, and/or the like.

The recommendations, actions, and clusters described above are provided as examples, and other examples may differ from what is described above.

In this way, the machine learning system may apply a rigorous and automated process to identify entity performance with respect to experience attributes, identify features and corresponding feature ranks of an experience attribute, identify a subset of features to improve to impact the entity performance with respect to experience attribute, generate one or more recommendations to improve the subset of features, and implement the one or more recommendations. The machine learning system enables recognition and/or identification of tens, hundreds, thousands, or millions of features and/or feature values for tens, hundreds, thousands, or millions of observations, thereby increasing accuracy and consistency and reducing delay associated with identify entity performance with respect to experience attributes, identify features and corresponding feature ranks of an experience attribute, identify a subset of features to improve to impact the entity performance with respect to experience attribute, generate one or more recommendations to improve the subset of features, and implement the one or more recommendations relative to requiring computing resources to be allocated for tens, hundreds, or thousands of operators to manually identify entity performance with respect to experience attributes, identify features and corresponding feature ranks of an experience attribute, identify a subset of features to improve to impact the entity performance with respect to experience attribute, generate one or more recommendations to improve the subset of features, and implement the one or more recommendations using the features or feature values.

As indicated above, FIG. 2 is provided as an example. Other examples may differ from what is described in connection with FIG. 2.

Figure 3:
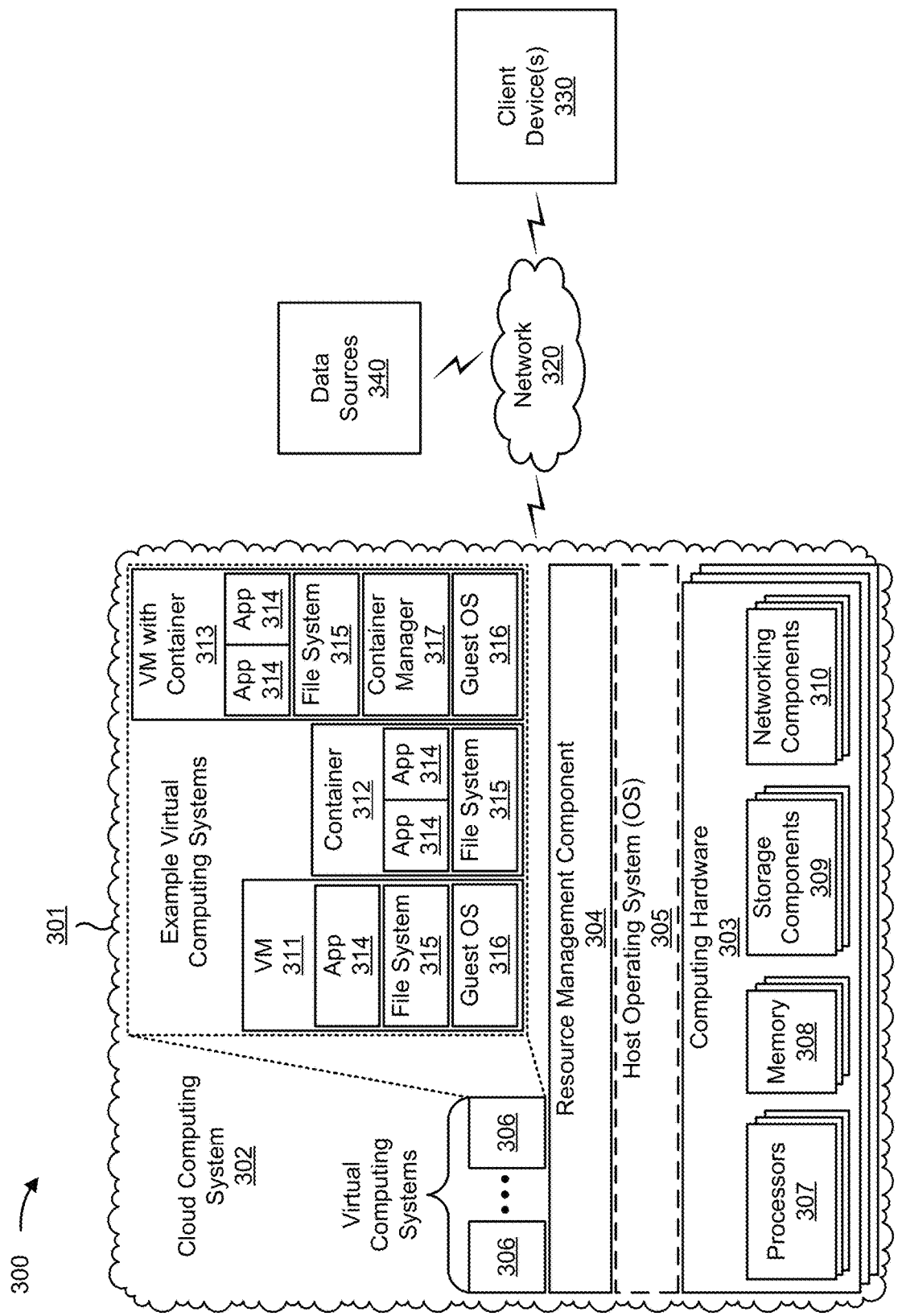
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a data analytics platform 301 (e.g., data analytics platform 102), which may include one or more elements of and/or may execute within a cloud computing system 302. The cloud computing system 302 may include one or more elements 303-313, as described in more detail below. As further shown in FIG. 3, environment 300 may include a network 320, one or more client devices 330, and/or one or more data sources 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the data analytics platform 301 may include one or more elements 303-313 of the cloud computing system 302, may execute within the cloud computing system 302, and/or may be hosted within the cloud computing system 302, in some implementations, the data analytics platform 301 may not be cloud-based (e.g., may be implemented outside of a cloud computing system) or may be partially cloud-based. For example, the data analytics platform 301 may include one or more devices that are not part of the cloud computing system 302, such as device 300 of FIG. 3, which may include a standalone server or another type of computing device. The data analytics platform 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The client device(s) device 330 may include one or more devices capable of receiving, generating, storing, processing, and/or providing information, such as information described herein. For example, a client device 330 may receive information from and/or transmit information to the data analytics platform 301, and/or the data sources 340. In some implementations, client device 330 may include a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a global positioning system (GPS) device, a server device, a personal computer, or a similar type of device.

The data sources 340 include one or more devices capable of storing, processing, and/or routing information associated with data. For example, data sources 340 may include a server (e.g., in a data center or a cloud computing environment), a data center (e.g., a multi-server micro data center), a workstation computer, a virtual machine (VM) provided in a cloud computing environment, or a similar type of device. In some implementations, data sources 340 may include a communication interface that allows data sources 340 to receive information from and/or transmit information to other devices in environment 300. In some implementations, data sources 340 may receive a request for information associated with data from data analytics platform 301 and may provide the information (e.g., stored in a database, retrieved by performing a web crawling procedure, and/or the like) to the data analytics platform 301. The data sources 340 may be external to the data analytics platform 301 (e.g., as shown in FIG. 3). Alternatively, the data sources 340 may be internal to the data analytics platform 301.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
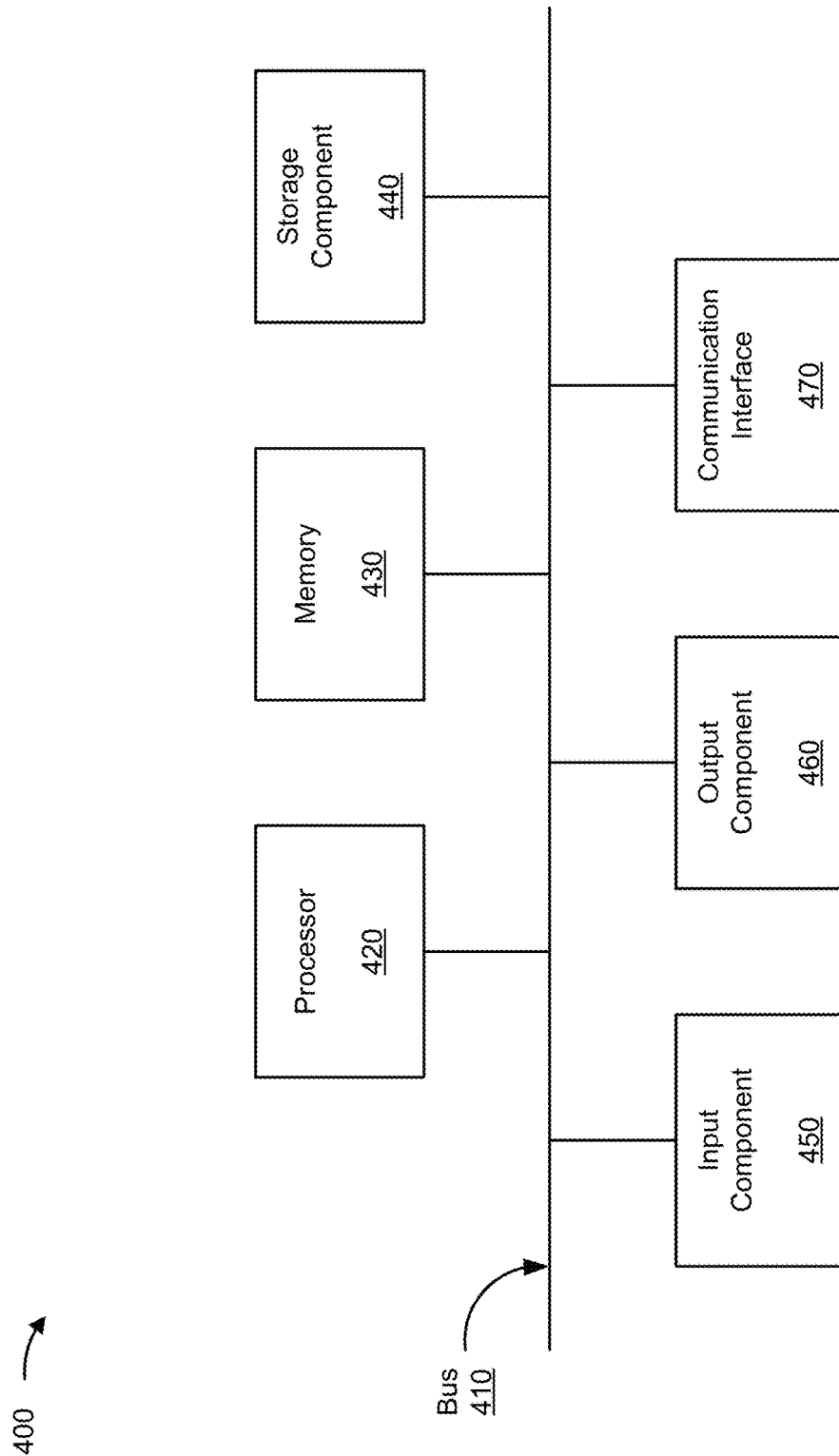
FIG. 4 is a diagram of example components of one or more devices of FIG. 3.

FIG. 4 is a diagram of example components of a device 400, which may correspond to data analytics platform 301, client device(s) 330, and/or data sources 340. In some implementations, data analytics platform 301, client device(s) 330, and/or data sources 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
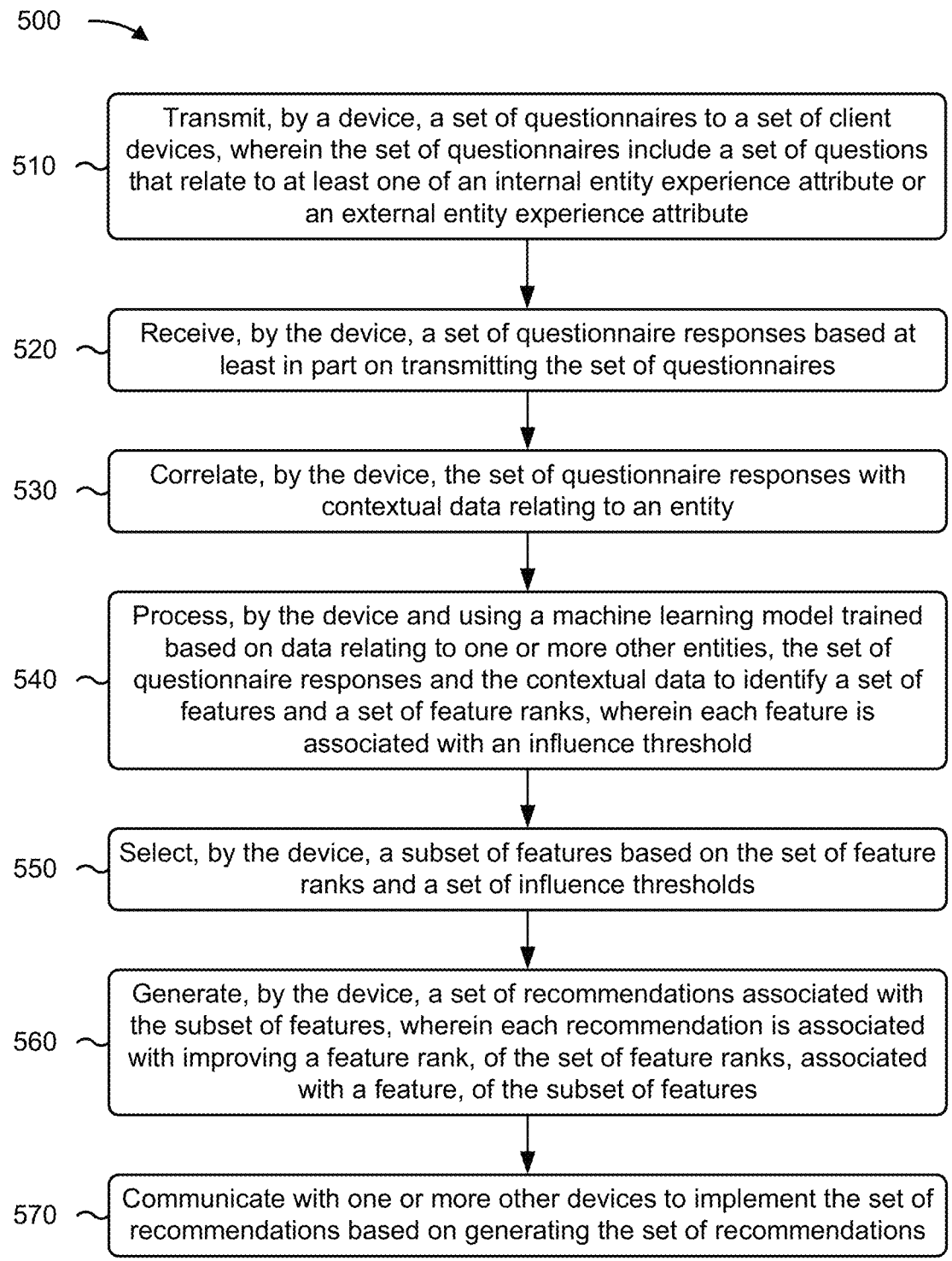
FIG. 5 is a flowchart of an example process relating to an analytics-driven recommendation engine.

FIG. 5 is a flowchart of an example process 500 associated with analytics-driven recommendation engine. In some implementations, one or more process blocks of FIG. 5 may be performed by a device (e.g., device 400, data analytics platform 102, data analytics platform 301, and/or the like). In some implementations, one or more process blocks of FIG. 5 may be performed by another device or a group of devices separate from or including the device, such as one or more client devices (e.g., client device(s) 330), data sources (e.g., data sources 340), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include transmitting a set of questionnaires to a set of client devices, wherein the set of questionnaires include a set of questions that relate to at least one of an internal entity experience attribute or an external entity experience attribute (block 510). For example, the device may transmit a set of questionnaires to a set of client devices, as described above. In some implementations, the set of questionnaires include a set of questions that relate to at least one of an internal entity experience attribute or an external entity experience attribute.

As further shown in FIG. 5, process 500 may include receiving a set of questionnaire responses based at least in part on transmitting the set of questionnaires (block 520). For example, the device may receive a set of questionnaire responses based at least in part on transmitting the set of questionnaires, as described above.

As further shown in FIG. 5, process 500 may include correlating the set of questionnaire responses with contextual data relating to an entity (block 530). For example, the device may correlate the set of questionnaire responses with contextual data relating to an entity, as described above.

As further shown in FIG. 5, process 500 may include processing, using a machine learning model trained based on data relating to one or more other entities, the set of questionnaire responses and the contextual data to identify a set of features and a set of feature ranks, wherein each feature is associated with an influence threshold (block 540). For example, the device may process, using a machine learning model trained based on data relating to one or more other entities, the set of questionnaire responses and the contextual data to identify a set of features and a set of feature ranks, as described above. In some implementations, each feature is associated with an influence threshold.

As further shown in FIG. 5, process 500 may include selecting a subset of features based on the set of feature ranks and a set of influence thresholds (block 550). For example, the device may select a subset of features based on the set of feature ranks and a set of influence thresholds, as described above.

As further shown in FIG. 5, process 500 may include generating a set of recommendations associated with the subset of features, wherein each recommendation is associated with improving a feature rank, of the set of feature ranks, associated with a feature, of the subset of features (block 560). For example, the device may generate a set of recommendations associated with the subset of features, as described above. In some implementations, each recommendation is associated with improving a feature rank, of the set of feature ranks, associated with a feature, of the subset of features.

As further shown in FIG. 5, process 500 may include communicating with one or more other devices to implement the set of recommendations based on generating the set of recommendations (block 570). For example, the device may communicate with one or more other devices to implement the set of recommendations based on generating the set of recommendations, as described above.

Process 500 may include additional implementations, such as any single implementation or any combination of implementations described below and/or in connection with one or more other processes described elsewhere herein.

In a first implementation, process 500 includes obtaining the data relating to the one or more other entities; dividing the data relating to the one or more other entities into a training data set and a validation data set; training the machine learning model using the training data set; and validating the machine learning model using the validation set based on training the machine learning model using the training data set.

In a second implementation, alone or in combination with the first implementation, obtaining the data relating to the one or more other entities comprises: obtaining a set of call recordings relating to performance of the one or more other entities; processing, using a voice-to-speech processing technique, the set of call recordings to generate a set of call transcripts, and processing, using a natural language processing technique, the set of call transcripts to generate call data.

In a third implementation, alone or in combination with one or more of the first and second implementations, training the machine learning model comprises: identifying a set of correlations between input data and output data; ranking the set of correlations based on a correlation strength; selecting a subset of the set of correlations for the set of features, and determining, for the subset of the set of correlations, the set of influence thresholds.

In a fourth implementation, alone or in combination with one or more of the first through third implementations, the internal entity experience attribute includes a set of underlying sub-attributes, and the subset of features corresponds to at least one underlying sub-attribute of the set of underlying sub-attributes.

In a fifth implementation, alone or in combination with one or more of the first through fourth implementations, the external entity experience attribute includes a set of underlying sub-attributes, and the subset of features corresponds to at least one underlying sub-attribute of the set of underlying sub-attributes.

In a sixth implementation, alone or in combination with one or more of the first through fifth implementations, process 500 includes generating a dashboard user interface that includes information associated with the subset of features; and providing the dashboard user interface for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
receive a command to identify a recommendation for an entity;
obtain, based on receiving the command, a data set relating to an internal entity experience attribute, an external entity experience attribute, and an entity performance attribute,
wherein the data set is associated with questionnaire data and workplace analytics data, and
wherein the questionnaire data and the workplace analytics data are obtained from different servers;
correlate, based on obtaining the data set, the questionnaire data with contextual data associated with the entity;
process, using a machine learning model trained based on data relating to one or more other entities, the data set to identify a set of features and a set of feature ranks, wherein the set of features is associated with a corresponding set of influence thresholds,
wherein the machine learning model is trained based on at least one of the questionnaire data or the workplace analytics data;
generate a set of feature scores for the set of features, wherein a feature score, of the set of feature scores, is based on a value of a feature rank, of the set of feature ranks, relative to an influence threshold, of the set of influence thresholds, a resource cost of changing the feature rank, and an estimated result of changing the feature rank;
select a particular feature, from the set of features, based on a corresponding feature score of the set of feature scores;
generate the recommendation for the particular feature using a recommendation engine; and
communicate with one or more systems to implement the recommendation based on generating the recommendation.

2. The device of claim 1, wherein the one or more processors are further configured to:
generate a user interface including information identifying the recommendation;
provide the user interface for display;
receive, based on providing the user interface for display, input confirming the recommendation; and
wherein the one or more processors, when communicating with the one or more systems to implement the recommendation, are to:
implement the recommendation based on receiving the input.

3. The device of claim 1, wherein the one or more processors, when generating the recommendation, are to:
generate a first recommendation;
provide the first recommendation for display via a user interface;
receive, via the user interface, input identifying an alteration to the first recommendation, the alteration comprising a second recommendation; and
wherein the one or more processors, when communicating with the one or more systems to implement the recommendation, are to:
implement the second recommendation based on receiving the input.

4. The device of claim 3, wherein the one or more processors are further configured to:
feed the second recommendation back into the recommendation engine to update the recommendation engine.

5. The device of claim 1, wherein the recommendation relates to implementation of at least one of:
a communication tool,
a collaboration tool,
an automation tool, or
a training tool.

6. The device of claim 1, wherein the machine learning model is generated using at least one of:
a clustering technique,
a polynomial regression technique,
a natural language processing technique,
a topic modeling technique,
an artificial intelligence technique,
a neural network technique, or
a pattern recognition technique.

7. The device of claim 1, wherein the data set includes at least one of:
social media data,
employee data,
human resources data,
customer data, or
workplace analytics data.

8. A non-transitory computer-readable medium storing a set of instructions, the set of instructions comprising:
one or more instructions that, when executed by one or more processors of a device, cause the device to:
receive a command to identify a recommendation for an entity;
obtain, based on receiving the command, a data set relating to an internal entity experience attribute, an external entity experience attribute, and an entity performance attribute,
wherein the data set is associated with questionnaire data and workplace analytics data, and
wherein the questionnaire data and the workplace analytics data are obtained from different servers;
correlate, based on obtaining the data set, the questionnaire data with contextual data associated with the entity;
process, using a machine learning model trained based on data relating to one or more other entities, the data set to identify a set of features and a set of feature ranks, wherein the set of features is associated with a corresponding set of influence thresholds,
wherein the machine learning model is trained based on at least one of the questionnaire data or the workplace analytics data;
generate a set of feature scores for the set of features, wherein a feature score, of the set of feature scores, is based on a value of a feature rank, of the set of feature ranks, relative to an influence threshold, of the set of influence thresholds, a resource cost of changing the feature rank, and an estimated result of changing the feature rank;
select a particular feature, from the set of features, based on a corresponding feature score of the set of feature scores;
generate the recommendation for the particular feature using a recommendation engine; and
communicate with one or more systems to implement the recommendation based on generating the recommendation.

9. The non-transitory computer-readable medium of claim 8, wherein the one or more instructions further cause the device to:
    generate a user interface including information identifying the recommendation;
    provide the user interface for display;
    receive, based on providing the user interface for display, input confirming the recommendation; and
    wherein the one or more instructions, that cause the device to communicate with the one or more systems to implement the recommendation, cause the device to:
        implement the recommendation based on receiving the input.

10. The non-transitory computer-readable medium of claim 8, wherein the one or more instructions, that cause the device to generate the recommendation, cause the device to:
    generate a first recommendation;
    provide the first recommendation for display via a user interface;
    receive, via the user interface, input identifying an alteration to the first recommendation, the alteration comprising a second recommendation; and
    wherein the one or more instructions, that cause the device to communicate with the one or more systems to implement the recommendation, cause the device to:
        implement the second recommendation based on receiving the input.

11. The non-transitory computer-readable medium of claim 10, wherein the one or more instructions further cause the device to:
    feed the second recommendation back into the recommendation engine to update the recommendation engine.

12. The non-transitory computer-readable medium of claim 8, wherein the recommendation relates to implementation of at least one of:
    a communication tool,
    a collaboration tool,
    an automation tool, or
    a training tool.

13. The non-transitory computer-readable medium of claim 8, wherein the machine learning model is generated using at least one of:
    a clustering technique,
    a polynomial regression technique,
    a natural language processing technique,
    a topic modeling technique,
    an artificial intelligence technique,
    a neural network technique, or
    a pattern recognition technique.

14. The non-transitory computer-readable medium of claim 8, wherein the data set includes at least one of:
    social media data,
    employee data,
    human resources data,
    customer data, or
    workplace analytics data.

15. A method, comprising:
    receiving, by a device, a command to identify a recommendation for an entity;
    obtaining, based on receiving the command, a data set relating to an internal entity experience attribute, an external entity experience attribute, and an entity performance attribute,
        wherein the data set is associated with questionnaire data and workplace analytics data, and
        wherein the questionnaire data and the workplace analytics data are obtained from different servers;
    correlating, by the device, based on obtaining the data set, the questionnaire data with contextual data associated with the entity;
    processing, by the device, using a machine learning model trained based on data relating to one or more other entities, the data set to identify a set of features and a set of feature ranks, wherein the set of features is associated with a corresponding set of influence thresholds,
        wherein the machine learning model is trained based on at least one of the questionnaire data or the workplace analytics data;
    generating, by the device, a set of feature scores for the set of features, wherein a feature score, of the set of feature scores, is based on a value of a feature rank, of the set of feature ranks, relative to an influence threshold, of the set of influence thresholds, a resource cost of changing the feature rank, and an estimated result of changing the feature rank;
    selecting, by the device, a particular feature, from the set of features, based on a corresponding feature score of the set of feature scores;
    generating, by the device, the recommendation for the particular feature using a recommendation engine; and
    communicating, by the device, with one or more systems to implement the recommendation based on generating the recommendation.

16. The method of claim 15, further comprising:
    generating a user interface including information identifying the recommendation;
    providing the user interface for display;
    receiving, based on providing the user interface for display, input confirming the recommendation; and
    wherein communicating with the one or more systems to implement the recommendation comprises:
        implementing the recommendation based on receiving the input.

17. The method of claim 15, wherein generating the recommendation comprises:
    generating a first recommendation;
    providing the first recommendation for display via a user interface;
    receiving, via the user interface, input identifying an alteration to the first recommendation, the alteration comprising a second recommendation; and
    wherein communicating with the one or more systems to implement the recommendation comprises:
        implementing the second recommendation based on receiving the input.

18. The method of claim 17, further comprising:
    feeding the second recommendation back into the recommendation engine to update the recommendation engine.

19. The method of claim 17, wherein the recommendation relates to implementation of at least one of:
    a communication tool,
    a collaboration tool,
    an automation tool, or
    a training tool.

20. The method of claim 17, wherein the machine learning model is generated using at least one of:
    a clustering technique,
    a polynomial regression technique,
    a natural language processing technique,
    a topic modeling technique, an artificial intelligence technique,
a neural network technique, or
a pattern recognition technique.

\* \* \* \* \*